(12) United States Patent
Edler et al.

(10) Patent No.: US 10,955,580 B2
(45) Date of Patent: Mar. 23, 2021

(54) TUNED PROBE STYLE PROPAGATION RESISTIVITY TOOL

(71) Applicant: Pulse Directional Technologies Inc., Calgary (CA)

(72) Inventors: Karl Edler, Calgary (CA); Steve Braisher, Okotoks (CA)

(73) Assignee: Pulse Directional Technologies Inc., Calgary (CA)

( * ) Notice: Subject to any disclaimer, the term of this patent is extended or adjusted under 35 U.S.C. 154(b) by 235 days.

(21) Appl. No.: 15/476,512

(22) Filed: Mar. 31, 2017

(65) Prior Publication Data

US 2017/0285213 A1    Oct. 5, 2017

Related U.S. Application Data

(60) Provisional application No. 62/316,372, filed on Mar. 31, 2016.

(51) Int. Cl.
*G01V 3/30* (2006.01)
*E21B 17/16* (2006.01)
*E21B 49/00* (2006.01)

(52) U.S. Cl.
CPC .............. *G01V 3/30* (2013.01); *E21B 17/16* (2013.01); *E21B 49/00* (2013.01)

(58) Field of Classification Search
CPC .............. G01V 3/18–32; E21B 17/16; E21B 49/00–10
See application file for complete search history.

(56) References Cited

U.S. PATENT DOCUMENTS

| | | | | |
|---|---|---|---|---|
| 5,368,109 | A * | 11/1994 | Pittard, Jr. ................ | E21B 4/02 175/107 |
| 9,632,203 | B2 * | 4/2017 | Hopper .............. | G01R 33/3607 |
| 2004/0056663 | A1 * | 3/2004 | Sinclair .................... | G01V 3/32 324/367 |
| 2009/0230968 | A1 * | 9/2009 | Bittar .................... | E21B 47/024 324/338 |
| 2011/0068798 | A1 * | 3/2011 | Minerbo .................. | G01V 3/28 324/343 |
| 2011/0204897 | A1 * | 8/2011 | Hu .......................... | G01V 3/24 324/351 |
| 2011/0215809 | A1 * | 9/2011 | Legendre ................. | G01V 3/18 324/339 |
| 2011/0315372 | A1 * | 12/2011 | Church ............... | E21B 17/1078 166/147 |

(Continued)

*Primary Examiner* — Huy Q Phan
*Assistant Examiner* — David B Frederiksen
(74) *Attorney, Agent, or Firm* — McAfee & Taft

(57) ABSTRACT

Tools and methods for measuring resistivity are provided. The tool for measuring resistivity in a formation comprises a receiver module comprising a first electromagnetic signal receiver and a second electromagnetic signal receiver; a first electromagnetic signal transmitter removably coupled to one longitudinal end of the receiver module; a second electromagnetic signal transmitter removably coupled to the other longitudinal end of the receiver module; and each of the first and the second electromagnetic signal receivers configured to receive electromagnetic signals propagating in the formation from the first and the second electromagnetic signal transmitters.

20 Claims, 11 Drawing Sheets

(56) References Cited

U.S. PATENT DOCUMENTS

| | | | |
|---|---|---|---|
| 2012/0024600 A1* | 2/2012 | Bittar | E21B 47/01 |
| | | | 175/50 |
| 2012/0170410 A1* | 7/2012 | Hay | E21B 17/028 |
| | | | 367/82 |
| 2012/0234605 A1* | 9/2012 | Donderici | G01V 1/46 |
| | | | 175/73 |
| 2013/0073206 A1* | 3/2013 | Hou | G01V 3/28 |
| | | | 702/7 |
| 2014/0350858 A1* | 11/2014 | Donderici | E21B 7/04 |
| | | | 702/7 |
| 2015/0315906 A1* | 11/2015 | Rodney | G01V 3/02 |
| | | | 340/854.4 |
| 2015/0322772 A1* | 11/2015 | Pelletier | G01J 5/00 |
| | | | 250/254 |
| 2015/0369950 A1* | 12/2015 | Wu | G01V 3/38 |
| | | | 702/7 |
| 2016/0170068 A1* | 6/2016 | Donderici | G01V 13/00 |
| | | | 324/339 |
| 2016/0245952 A1* | 8/2016 | Dupuis | G01V 3/38 |
| 2017/0261634 A1* | 9/2017 | Pan | G01V 3/30 |

\* cited by examiner

TUNED PROBE STYLE PROPAGATION RESISTIVITY TOOL

CROSS REFERENCE TO RELATED APPLICATION

This is an United States non-provisional patent application claiming priority to, and the benefit of, U.S. Provisional Application Ser. No. 62/316,372, filed on Mar. 31, 2016, the entirety of which is hereby incorporated by reference.

FIELD OF THE INVENTION

The invention relates to a resistivity tool used in oil and gas exploration.

BACKGROUND

A drill string consists of a bit, followed by a series of inter-connected downhole tools. Many of these tools perform measurements on the surrounding geological formations. The measurement results are transferred to the directional unit which manages the communication of this data to the surface. Based on this data, the human operator decides what must be done to steer the entire drill string towards the desired target.

Above the downhole tools, there is a long series of pipe sections reaching to the surface and the drilling rig. Mud is pumped down this pipe at a high pressure and this mud turns the mud motor and squirts through the bit to help cut the borehole and clear the cuttings.

The three most basic electromagnetic properties that all materials possess are electric permittivity ($\varepsilon$), magnetic permeability ($\rho$), and conductivity ($\sigma$). The inverse of conductivity is resistivity $\rho=1/\sigma$, which is measured in units of $\Omega \cdot m$ and is responsible for the electrical resistance of materials. For example, given the cross-sectional shape of a wire, its length, and a material's resistivity, the total electrical resistance of the wire can be calculated.

In the context of drilling, the electrical resistivity of normal salt-water bearing formations is quite low (<10 $\Omega \cdot m$) while that of formations containing natural gas and oil is quite high (>100 $\Omega \cdot m$). Accordingly, it is valuable to measure the resistivity of the environment surrounding a drill string. One manner of making the resistivity measurement would be to place two probes on the outside of the drill collar, put a voltage across the probes, and measure the current. The ratio of voltage to current is resistance and, with some knowledge of the current path, the resistivity could be estimated.

These types of measurements can have disadvantages. For instance, the space directly around the drill collar is surrounded by drilling mud and it would be beneficial to measure the resistivity of the surrounding material in a way that is minimally influenced by the drilling fluid. It would also be beneficial to estimate the resistivity as a function of depth such that the presence of a material layer can be sensed without actually penetrating it.

A need therefore exists for an improved system and method for measuring resistivity in a formation. Accordingly, a solution that addresses, at least in part, the above and other shortcomings is desired.

SUMMARY OF THE INVENTION

One aspect of the invention provides a tool for measuring resistivity in a formation. The tool includes a receiver module comprising a first electromagnetic signal receiver and a second electromagnetic signal receiver; a first electromagnetic signal transmitter removably coupled to one longitudinal end of the receiver module; a second electromagnetic signal transmitter removably coupled to the other longitudinal end of the receiver module; and each of the first and the second electromagnetic signal receivers configured to receive electromagnetic signals propagating in the formation from the first and the second electromagnetic signal transmitters.

In some embodiments, the electromagnetic signal transmitters comprise transmitter coils. In some embodiments, the electromagnetic signal receivers comprise receiver coils.

In some embodiments, the receiver module comprises a male portion configured for removable coupling to a female portion of the first electromagnetic signal transmitter. In some embodiments, the receiver module comprises a female portion configured for removable coupling to a male portion of the second electromagnetic signal transmitter.

In some embodiments, the resistivity tool comprises bow-springs between the electromagnetic signal transmitter and the receiver module that are electrically connected to the drill collar.

In some embodiments, the drill collar comprises at least one cut-out configured to allow electromagnetic signals to be transmitted into the formation from the first and second electromagnetic signal transmitters. In some embodiments, the drill collar comprises three cut-outs. In some embodiments, the cut-outs are blocked with non-conductive plugs. In some embodiments, the cut-outs are blocked with conductive plugs.

In some embodiments, the resistivity tool comprises at least one grounding spring contact positioned within the tool, the grounding spring contact configured to block electromagnetic signals produced by the first and second electromagnetic signal transmitters propagating within the tool. In some embodiments, at least one of the grounding spring contacts engage a ground shield of a wiring harness positioned along a longitudinal axis of the tool.

In some embodiments, at least one of the grounding spring contacts comprise a circular spring electrically grounding one side of the tool containing electronics. In some embodiments, at least one of the grounding spring contacts comprise a conical spring. In some embodiments, at least one of the grounding spring contacts comprise a toroidal spring.

In some embodiments, wherein the transmitter coils and the receiver coils are covered by a metal shield that has a series of slits and the slits and the external bow-springs are configured to block electromagnetic signals produced by the first and second electromagnetic signal transmitters propagating between the tool and the drill collar.

In some embodiments, the resistivity tool is a probe-style tool that is not mechanically locked to the drill collar.

In some embodiments, each of the first and the second electromagnetic signal transmitters is housed in a transmitter module.

In some embodiments, the resistivity tool is configured to be used in conjunction with other tensor or CAN based measurement-while-drilling tools.

In some embodiments, the tool is configured for use with water or oil-based drilling mud.

In some embodiments, the resistivity tool is configured to measure the phase shift of the electromagnetic signals at or between 400 kHz and 2 MHz.

In some embodiments, the resistivity tool is configured to measure the attenuation of the electromagnetic signals at or between 400 kHz and 2 MHz.

In some embodiments, the resistivity tool comprises at least one additional electromagnetic signal transmitter removably coupled to each of the first and the second electromagnetic signal transmitters.

In some embodiments, the electromagnetic signal transmitter comprises a double-tuned and impedance-matched circuit at 400 kHz and 2 MHz, and a driver circuit that sources and sinks current through the tuned and matched circuit simultaneously.

In some embodiments, the electromagnetic signal receiver comprises a coil connected to a double-tuned and impedance-matched circuit that interfaces the coil to a fully differential low noise amplifier.

In some embodiments, the electromagnetic signals received by the electromagnetic signal receivers are processed to remove noise.

In some embodiments, the noise removal comprises cancelling out start phases of the electromagnetic signal receivers and adding a constant phase.

Another aspect of the present invention provides a method for configuring a tool for measuring resistivity in a formation. The method includes the steps of: measuring a first electromagnetic signal transmitted by a first electromagnetic signal transmitter using a first electromagnetic signal receiver and a second electromagnetic signal receiver in a receiver module and generating a first calculation from such measurements, the first electromagnetic signal transmitter removably coupled to one longitudinal end of the receiver module; measuring a second electromagnetic signal transmitted by a second electromagnetic signal transmitter using the first electromagnetic signal receiver and the second electromagnetic signal receiver in the receiver module and generating a second calculation from such measurements, the second electromagnetic signal transmitter removably coupled to the other longitudinal end of the receiver module; combining the first calculation and the second calculation to generate a combined calculation; and configuring the tool using the combined calculation.

In some embodiments, each of the first calculation and the second calculation comprises a first and a second magnitude ratio, and combining the first calculation and the second calculation to generate a combined calculation comprises combining the first and the second magnitude ratio using geometric means to generate a combined magnitude ratio calculation.

In some embodiments, each of the first calculation and the second calculation comprises a first and a second phase shift, and combining the first calculation and the second calculation to generate a combined calculation comprises combining the first and the second phase shift using arithmetic means to generate a combined phase shift calculation.

In some embodiments, the step of calculating a first phase shift using the measurements of the first electromagnetic signal and a second phase shift using the measurements of the second electromagnetic signal; combining the first phase shift and the second phase shift using arithmetic means to generate a combined phase shift calculation; and wherein calibrating the resistivity tool using the combined calculation comprises using the combined phase shift calculation and the combined magnitude ratio calculation.

The details of one or more embodiments are set forth in the description below. Other features and advantages will be apparent from the specification and the claims.

BRIEF DESCRIPTION OF THE DRAWINGS

Features and advantages of the embodiments of the present invention will become apparent from the following detailed description, taken in combination with the appended drawings, in which.

In the description which follows, like parts are marked throughout the specification and the drawings with the same respective reference numerals.

DETAILED DESCRIPTION OF THE EMBODIMENTS

The description which follows and the embodiments described therein are provided by way of illustration of an example or examples of particular embodiments of the principles of the present invention. These examples are provided for the purposes of explanation and not limitation of those principles and of the invention. In some instances, certain structures and techniques have not been described or shown in detail in order not to obscure the invention.

The embodiments described herein relate to a tool for use in measuring resistivity in a formation. The tool includes a receiver module comprising a first electromagnetic signal receiver and a second electromagnetic signal receiver; a first electromagnetic signal transmitter removably coupled to one longitudinal end of the receiver module; and a second electromagnetic signal transmitter removably coupled to the other longitudinal end of the receiver module. Each of the first and the second electromagnetic signal receivers is configured to receive electromagnetic signals propagating in the formation from the first and the second electromagnetic signal transmitters.

Figure 1A:
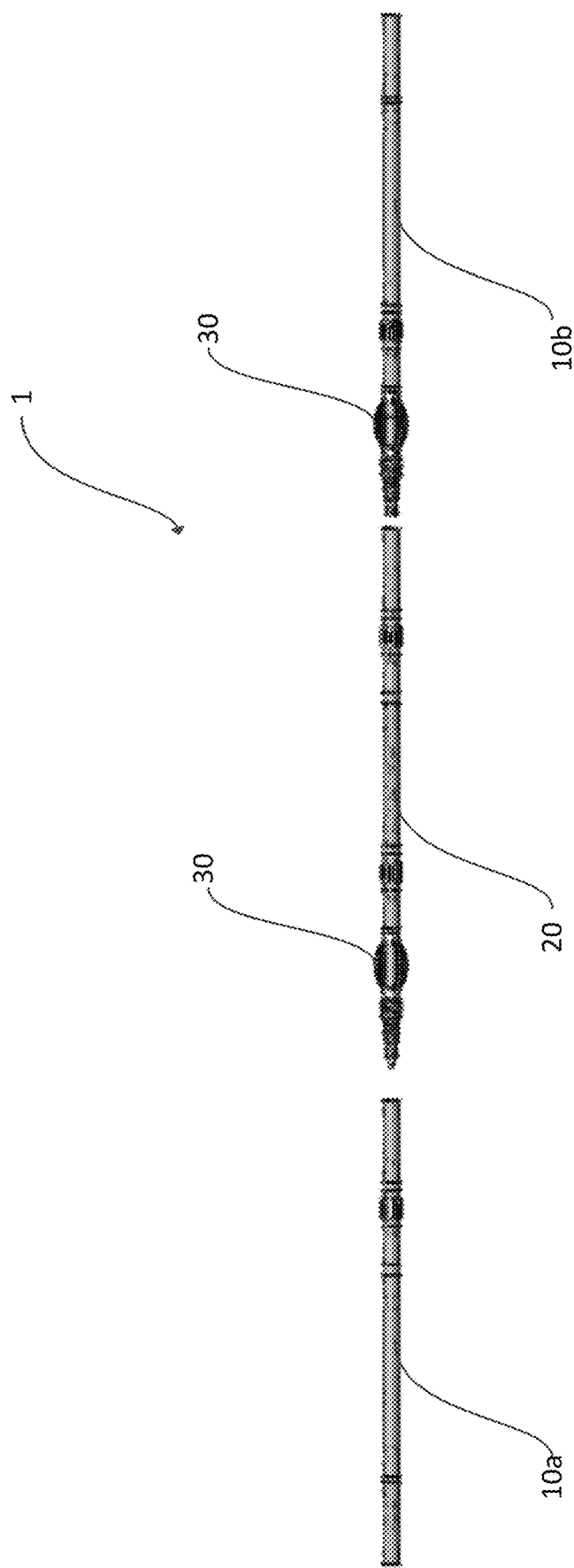
FIG. 1A is a side view of the resistivity tool according to an embodiment.
Figure 1B:
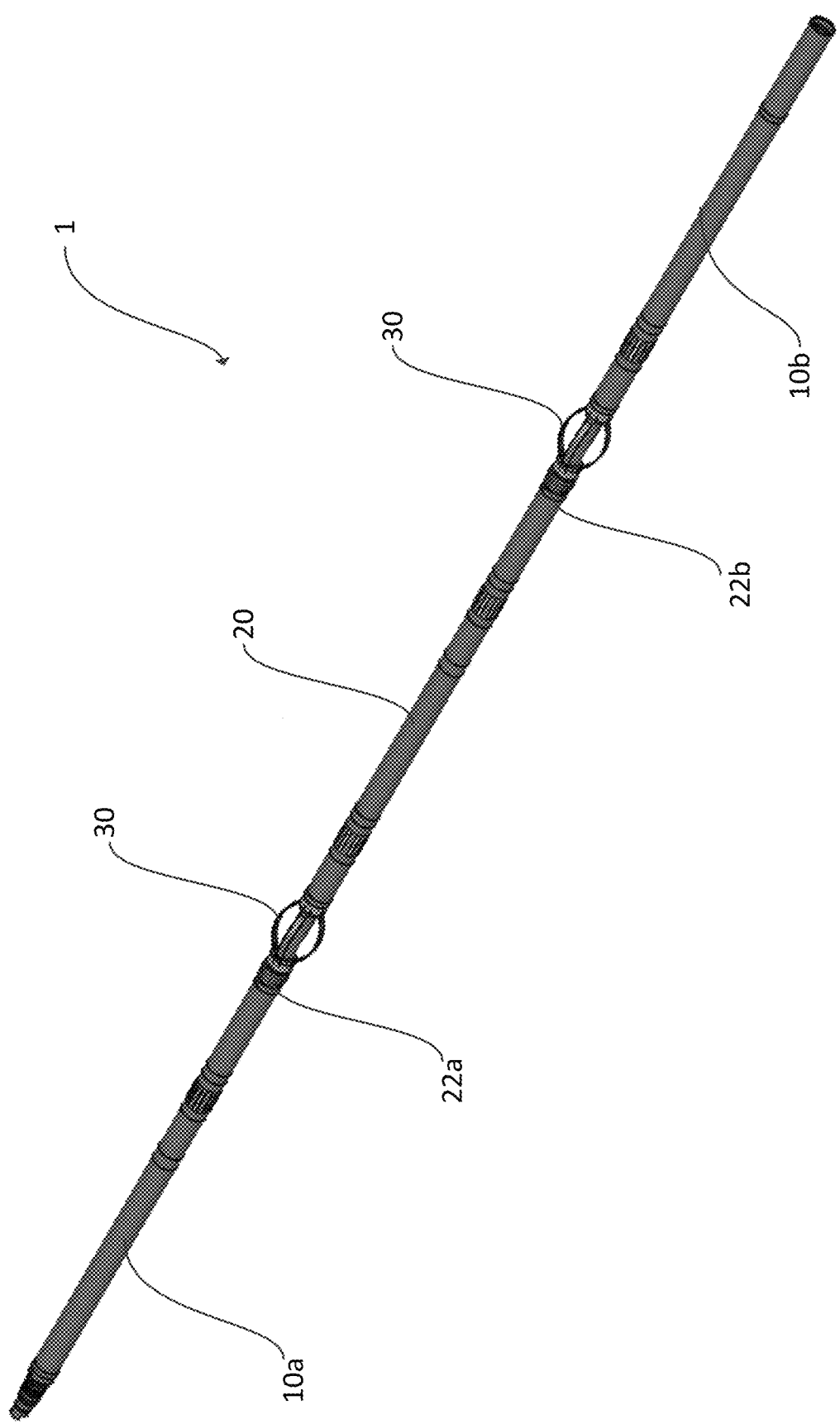
FIG. 1B is a perspective view of the resistivity tool of FIG. 1A when assembled.
Figure 1C:
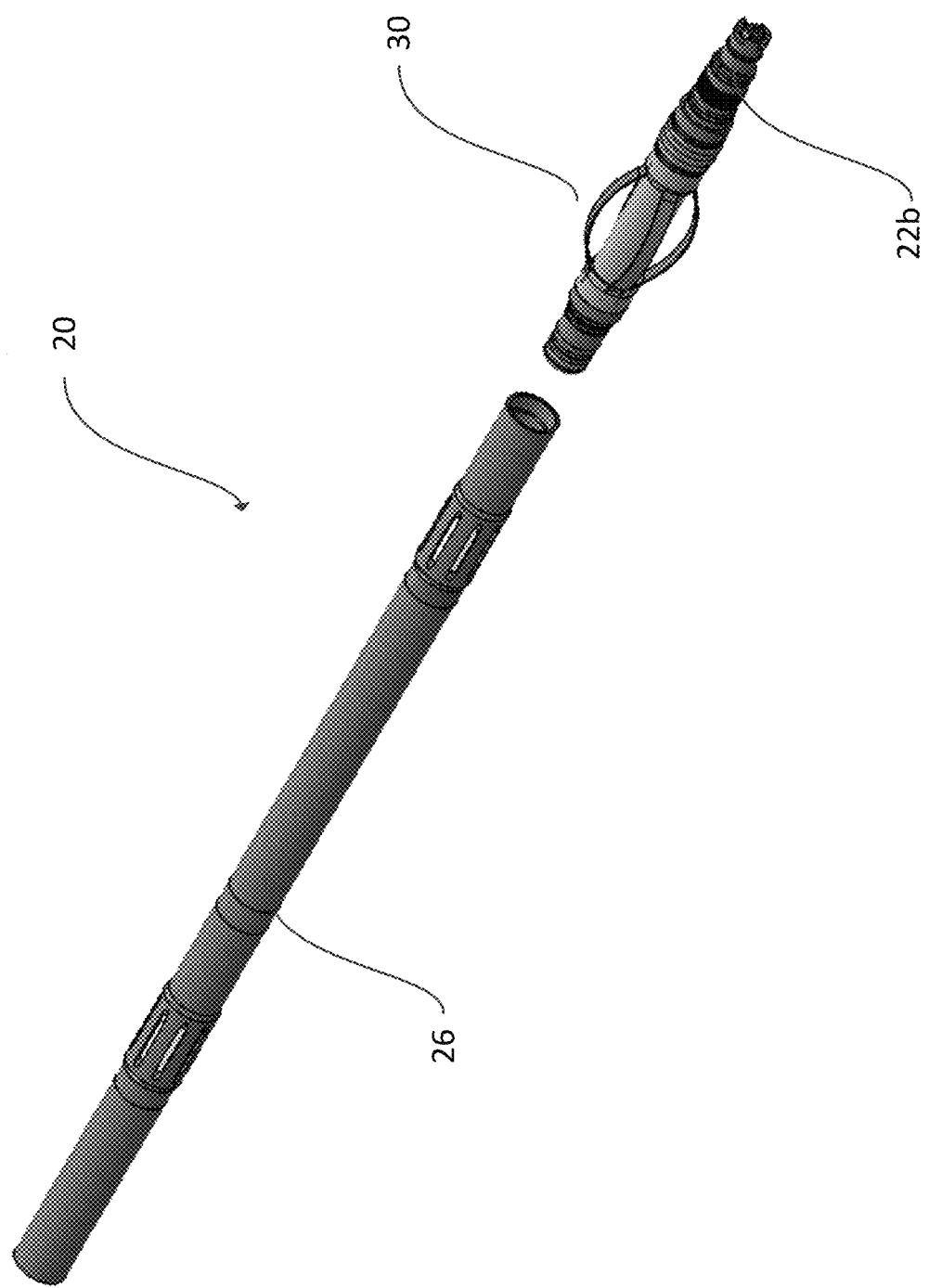
FIG. 1C is a perspective view of an electromagnetic signal receiver and the associated housing of the resistivity tool of FIG. 1A.

In the embodiment illustrated in FIGS. 1A to 1C, the resistivity tool 1 comprises 2 electromagnetic (EM) signal transmitters 10a and 10b and 1 EM signal receiver module 20. In this embodiment, the EM signal receiver module 20 includes a first EM signal receiver 22a and a second EM signal receiver 22b. Each of the first EM signal receiver 22a and the second EM signal receiver 22b is configured to receive EM signals propagating in the formation from the first EM signal transmitter 10a and the second EM signal transmitter 10b, respectively. In some embodiments, the resistivity tool 1 comprises more than one EM signal receiver module having a pair of EM signal receivers. In some embodiments, the EM signal receivers 22a and 22b are in separate modules. As illustrated in FIG. 1C, the EM signal receiver module 20 comprises a housing shaped and configured to removably couple to the EM signal receivers 22a and 22b.

In the embodiment illustrated in FIGS. 1A and 1B, the EM signal receiver module 20 is positioned between the first EM signal transmitter 10a and the second EM signal transmitter 10b. The first EM signal transmitter 10a and the second EM signal transmitter 10b are removably coupled to the EM signal receiver module 20. In this embodiment, each of the EM signal transmitters 10a and 10b is housed in a modular housing.

In this embodiment, the EM signal transmitter 10a and 10b are removably coupled to either side of EM signal receiver module 20. In one embodiment, the EM signal receiver module 20 comprises male portions on each side for removably coupling to female portions of the first and second EM signal transmitters 10a and 10b. In another embodiment, the EM signal receiver module 20 comprises a female portion at one longitudinal end and a male portion at the other longitudinal end; the female portion is configured for removable coupling to a male portion on one of the EM signal transmitters (i.e., EM signal transmitter 10a or 10b) and the male portion is configured for removable coupling to a female portion on the other of the EM signal transmitters (i.e., EM signal transmitter 10b or 10a).

In some embodiments, the external surfaces of the connector portions (e.g., male and female portions and the like) of different components of resistivity tool 1 (such as EM signal transmitter 10, EM signal receiver 22, housing of EM signal transmitter 10, housing of EM signal receiver module 20, and the like) may have grooves, threads, or rings to facilitate the mating of the male and female portions of the different components of resistivity tool 1.

In one embodiment, the electronic and mechanical connections to the resistivity tool 1 are made using standard Kintec connectors. In some embodiments, other connectors known to a person skilled in the art may be used.

Figure 2:
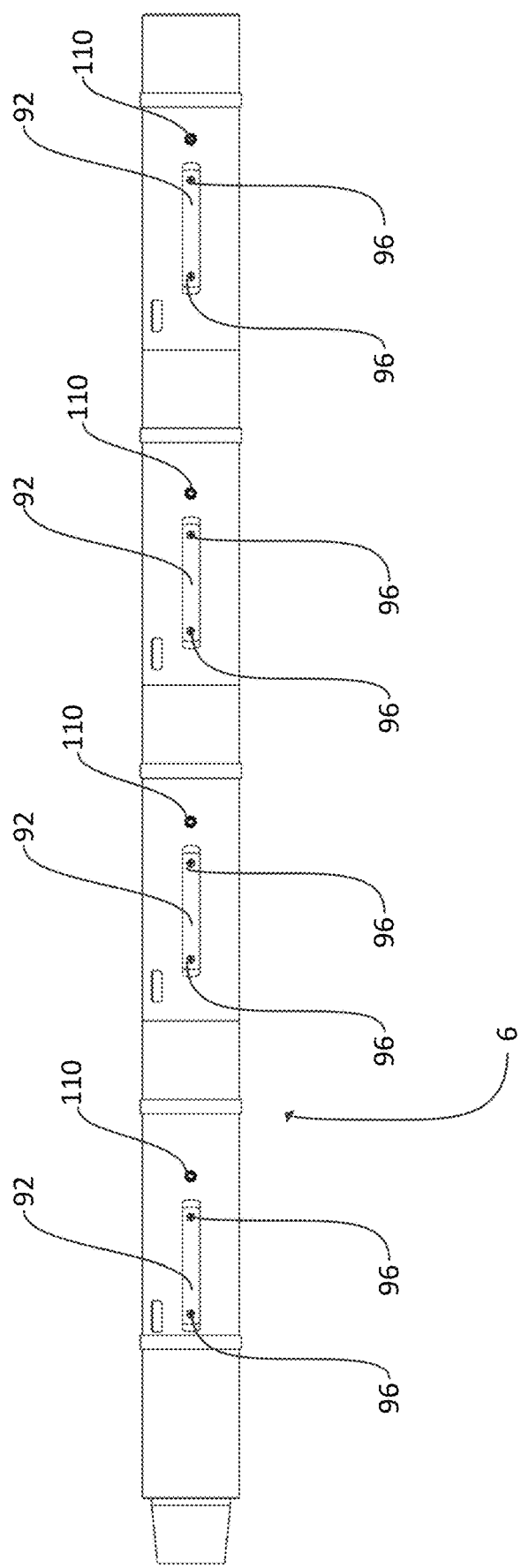
FIG. 2 is a side view of a collar for a resistivity tool according to an embodiment.

The resistivity tool 1 is shaped to fit inside a drill collar 6. One embodiment of a drill collar 6 is shown in FIG. 2. In the illustrated embodiment, the drill collar 6 comprises non-magnetic stainless steel. In some embodiments, the drill collar 6 comprises other non-magnetic metals or alloys that are conductive. In one embodiment, the resistivity tool 1 is externally circular. In some embodiments, the resistivity tool 1 is externally oval. In some embodiments, the size of the drill collar 6 ranges from 3" to 36" in diameter. In some embodiments, drill collar 6 may be 3.75", 4.75", 6.5", or 8" in diameter. In the embodiment illustrated in FIG. 2, collar 6 comprises 4 discrete segments torqued together using standard threads.

While the embodiment illustrated in FIGS. 1A and 1B comprises a first EM signal transmitter 10a and the second EM signal transmitter 10b coupled to either longitudinal end of the EM signal receiver module 20, in other embodiments, more than 1 pair of EM signal transmitters 10 can be coupled to either longitudinal end of the tool 1. In one embodiment, a third EM signal transmitter is coupled to the open longitudinal end of the first EM signal transmitter 10a and a fourth EM signal transmitter is coupled to the open longitudinal end of the second EM signal transmitter 10b. As a person skilled in the art may appreciate, more than one pair of EM signal transmitters 10 may be coupled around the EM signal receiver module 20.

Where there are multiple pairs of EM signal transmitters 10 coupled along the longitudinal axis of the resistivity tool 1, the EM signal receiver module may be configured to receive signals from all of the pairs of EM signal transmitters. For example, adding an extra transmitter section to either longitudinal end would increase the number of measurements from four to eight with the new measurements having increased depths of investigation and decreased vertical resolutions.

In the embodiment illustrated in FIGS. 1A to 1C, there is one EM signal receiver module 20 comprising two EM signal receivers 22a and 22b. In some embodiments, the resistivity tool 1 may have a symmetrical arrangement of EM signal transmitters 10 and EM signal receivers 22 relative to the longitudinal axis of the resistivity tool 1.

In some embodiments, each of the EM signal transmitters 10 comprises transmitter coils wrapped around an inner ferrite and a tuned RF power amplifier. In some embodiments, the transmitter coil may be built without a ferrite core, wrapped on an angle, or wrapped with a complex pattern to shape and optimize the resulting field. In some embodiments, the surrounding conductors which are part of the mechanical assembly may be shaped to reduce eddy currents and direct the EM signal out of the resistivity tool 1 and into the surrounding formation. A person skilled in the art may also appreciate that the RF power amplifier need not necessarily be tuned and could employ various circuit topologies and stages.

In some embodiments, each of the EM signal receivers 22 comprises receiver coils wrapped around an inner ferrite and an extremely sensitive tuned receiver circuit. In some embodiments, the receiver coils may be built without a ferrite core, wrapped on an angle, or wrapped with a complex pattern to shape and optimize signal reception. In some embodiments, the surrounding conductors which are part of the mechanical assembly may be shaped to reduce eddy currents and direct the EM signal into the receiver circuit of EM signal receiver 22. A person skilled in the art may also appreciate that the receiver circuit need not necessarily be tuned and could employ various circuit topologies and stages. For example, the receiver circuit could be inductively, capacitively, or directly coupled to the receiver preamplifier which could be a standard operational amplifier or a fully differential design. In some embodiments, the preamplifier output could be digitized directly, or fed through a mixer and filter such that only a lower intermediate frequency is digitized.

In one embodiment, the resistivity tool 1 is configured to connect to a tool string (e.g., a GE Tensor style tool string), including a measurement-while-drilling tool string. In some embodiments, the resistivity tool 1 is a probe-style tool that is not mechanically locked to the drill collar 6.

In some embodiments, the resistivity tool 1 is configured for use with water-based drilling mud. In other embodiments, the resistivity tool 1 is configured for use with oil-based drilling mud.

In some embodiments, the resistivity tool 1 operates using the CAN-bus communication protocol. In further embodiments, the CAN-bus messages are communicated at 250 Kbps with differential termination of 120Ω. In yet further embodiments, the resistivity tool 1 communicates using standard CAN-bus messages with an 11-bit identifier field. In some embodiments, the resistivity tool 1 operates using GE Tensor compatible qBus communication protocol. In some embodiments, the resistivity tool 1 operates using both the CAN-bus and GE Tensor compatible qBus communication protocol. In some embodiments, the resistivity tool 1 operates using other standard communication protocols known to a person skilled in the art.

In one embodiment, the resistivity tool 1 has the standard operating parameters as summarized below:

| | |
|---|---|
| Nominal Tool O.D. | 3.75", 4.75", 6.5", and 8" |
| Tool Length | 138.31" (3.513 m) |
| Collar Length | 94" (2.388 m) |
| Mag Dogleg | 15 deg/30 m |
| Maximum Operating Temp | 150 C. |
| Maximum Operating Pressure | 20,000 psi |
| Maximum Sand Content | 0.50% |
| Recorder Capacity | 40000 Records |
| Power Source | 4-28 V Lithium Batteries 25AH |
| Input Voltage Range | 18.5-30 VDC |
| Nominal Idle Current | 50 mA |
| Peak Sampling Current | 680 mA |
| Average Sampling Current Draw | Depends on Sample Rate |
| Minimum sample acquisition time | 8 seconds |
| Nominal sample acquisition time | 28 seconds |
| qBus Node Number | 23 |

In one embodiment, the magnitude and phase stability of the resistivity tool 1 are constant, but the precision of the measured resistivities decrease as the formation resistivity increases. In some embodiments, the resistivity tool is configured to measure the phase shift of the EM signals at or between 400 kHz and 2 MHz. In some embodiments, the resistivity tool 1 is configured to measure attenuation of the EM signals at or between 400 kHz and 2 MHz Table 2 illustrates characteristic precisions of the resistivity tool 1 in one embodiment:

TABLE 2

Resistivity Range and Precision

| Measurement | Range | Precision |
|---|---|---|
| 2 MHz Phase Shift | 0.5 to 50 Ω · m | ±5% |
| | 50 to 1000 Ω · m | ±7 mS/m |
| 400 kHz Phase Shift | 0.1 to 10 Ω · m | ±5% |
| | 10 to 500 Ω · m | ±5 mS/m |
| 2 MHz Attenuation | 0.5 to 25 Ω · m | ±5% |
| | 25 to 500 Ω · m | ±3 mS/m |
| 400 kHz Attenuation | 0.1 to 5 Ω · m | ±5% |
| | 5 to 500 Ω · m | ±3 mS/m |

Table 3 illustrates the radius of investigation and vertical resolution for each of the four measurements, which changes with the formation resistivity, for one embodiment of the resistivity tool 1:

TABLE 3

Resistivity Depth of Investigation and Vertical Resolution

| Measurement | Vertical Resolution 1 Ω · m | Radius of Investigation 1 Ω · m | Vertical Resolution 10 Ω · m | Radius of Investigation 10 Ω · m |
|---|---|---|---|---|
| 2 MHz Phase Shift | 12" (30.5 cm) | 18" (45.5 cm) | 21" (53.5 cm) | 28" (71.0 cm) |
| 400 kHz Phase Shift | 16" (40.5 cm) | 24" (62.5 cm) | 28" (71.0 cm) | 37" (94.0 cm) |
| 2 MHz Attenuation | 22" (56.0 cm) | 30" (72.75 cm) | 40" (102.0 cm) | 48" (122.0 cm) |
| 400 kHz Attenuation | 33" (84.0 cm) | 41" (104.5 cm) | 58" (147.0 cm) | 76" (193.0 cm) |

In the illustrated embodiment, by having two EM signal transmitters 10a and 10b set on either side of the EM signal receiver module 20, two very similar measurements can be produced, one starting from each EM signal transmitter 10. By combining the magnitude ratios from these measurements using the geometric mean and combining the phase shifts of the measurements using the arithmetic mean, the subtle imperfections and variations from the electronics in the resistivity tool 1 drop out of the result, leaving only the influence from the surrounding formation.

In the first measurement, the first EM signal transmitter 10a transmits a signal:

$$S_{T1} = M_{T1} e^{i\omega t + \phi_{T1}}$$

with magnitude M1 and phase φ 1 from the first EM signal transmitter 10a.

The first EM signal receiver 22a in EM signal receiver module 20 receives a signal:

$$S_{T1R1} = M_{T1} A_{T1R1} G_{R1}^{i\omega t + \phi_{T1} + \phi_{T1R1} - \phi_{R1}}$$

and the second EM signal receiver 22b in EM signal receiver module 20 receives a signal:

$$S_{T1R2} = M_{T1} A_{T1R1} G_{R2}^{i\omega t + \phi_{T1} + \phi_{T1R2} - \phi_{R2}}$$

where $A_{T1Rx}$ and $\phi_{T1Rx}$ are the attenuation and phase shift associated with the wave travelling outside the collar from the first EM signal transmitter 10a to the first EM signal receiver 22a and second EM signal receiver 22b in the EM signal receiver module 20 while $G_{Rx}$ and $\phi_{Rx}$ are the gain and phase shift associated with each of the first EM signal receiver 22a and the second EM signal receiver 22b.

Accordingly, the magnitude ratio between the two received signals from the first EM signal transmitter 10a is:

$$MR_{T1} = A_{T1R1} G_{R1} / A_{T1R2} G_{R2}$$

where the contribution from the circuit of the first signal transmitter 10a has cancelled out.

The phase shift between the two received signals from the first EM signal transmitter 10a is:

$$PS_{T1} = \phi_{T1R1} - \phi_{T1R2} + \phi_{R1} - \phi_{R2}$$

where the contribution from the circuit of the first signal transmitter 10a has cancelled out.

When the EM signal transmitted by the second EM signal transmitter 10b is taken into consideration, phases can be in the opposite order since the second EM signal transmitter 10b is removably coupled to the other longitudinal end of the EM signal receiver module 20. When the magnitude ratios of the two EM signals transmitted from the first and second EM signal transmitter 10a and 10b are combined using the geometric means, the following occurs:

$$MR = \sqrt{MR_{T1} \cdot MR_{T2}}$$

$$= \sqrt{\frac{A_{T1R1}G_{R1}}{A_{T1R2}G_{R2}} \cdot \frac{A_{T2R2}G_{R2}}{A_{T2R1}G_{R1}}}$$

$$= \sqrt{\frac{A_{T1R1}}{A_{T1R2}} \cdot \frac{A_{T2R2}}{A_{T2R1}}}.$$

The properties of the circuit of the EM signal receivers 22 and 22b are then cancelled out.

Assuming the resistivity tool 1 is perfectly symmetrical and the geological formation is perfectly homogeneous, the result would further simplify to:

$$MR = A_{TaRa}/A_{TaRb}$$

because the attenuation would be the same from T1 to R1 as it would be from T2 to R2.

Any magnitude scale factor on either an EM signal transmitter 10 or EM signal receiver 22 cancels out, provided it remains the same for both measurements and the geometric mean is used to combine the results.

Similarly, the phase measurements can be combined using a simple average, the arithmetic mean, with the following formula:

$$PS = \frac{(PS_{T1} + PS_{T2})}{2} = \frac{((\phi_{T1R1} + \phi_{T2R2}) - (\phi_{T1R2} - \phi_{T2R1}))}{2}$$

The phases from the EM signal receivers 22a and 22b have cancelled out leaving only the influence from the formation outside the drill collar 6. Assuming the resistivity tool 1 is perfectly symmetrical and the geological formation is perfectly homogeneous, then the phase shift from T1 to R1 is the same as that from T2 to R2. The measured phase shift would then reduce to:

$$PS = \phi_{TaRa} - \phi_{TaRb}$$

which is the phase difference caused by the geological formation between the two receivers.

In this embodiment, the structure of resistivity tool 1 allows arbitrary phase shifts on an EM signal transmitter 10 or an EM signal receiver 22 to cancel out, provided it remains the same for both measurements and the arithmetic mean is used to combine the phase shifts.

The resistivity tool 1 may comprise structures to prevent EM signals produced by the first and second EM signal transmitters 10a and 10b, from flowing inside the space between the collar 6 and the resistivity tool 1.

In one embodiment, the EM signal transmitters 10a and 10b comprise transmitter coils, and the resistivity tool 1 comprises metal shields having a series of slits over the transmitter coils. In some embodiments, the resistivity tool 1 can comprise bow-springs 30 on its external surface, which electrically connect the collar 6 and the resistivity tool 1. The combination of slits and the electrical connection via the bow-springs 30 blocks the EM signals produced by the EM signal transmitters 10a and 10b from propagating between the collar 6 and the resistivity tool 1.

In one embodiment, the external bow-springs 30 are integral to the housing of the resistivity tool 1. In some embodiments, the external bow-springs 30 are mounted on the resistivity tool 1. In some embodiments, the external bow-springs 30 are part of the collar 6. In some embodiments, the external bow-springs 30 are part of EM signal transmitter 10. In some embodiments, the external bow-springs 30 are part of EM signal receiver 22. In some embodiments, the external bow-springs are positioned between two EM signal receivers 22 (e.g., EM signal receiver 22a and 22b).

In some embodiments, there are electrical contacts to the collar 6 between every pair of adjacent modules (i.e., an EM signal transmitter module and an EM signal receiver module). In some embodiments, there are electrical contacts to the collar between every pair of adjacent coils (i.e., a transmitter coil in a EM signal transmitter 10 and a receiver coil in a EM signal receiver 22). In some embodiments, there are electrical contacts to the collar between each of the EM signal receivers 22a and 22b within EM signal receiver module 20. In other embodiments, there are only contacts separating EM signal transmitter modules from EM signal receiver modules.

The resistivity tool 1 may comprise structures to prevent EM signals from flowing inside the interior of the resistivity tool 1.

In one embodiment, the resistivity tool 1 comprises a series of grounding spring contacts within the resistivity tool 1. In some embodiments, wherever there is a space inside the resistivity tool 1 where EM signals could propagate, the space is directly grounded on all sides through the central wiring harness using a circular spring.

Figure 3:
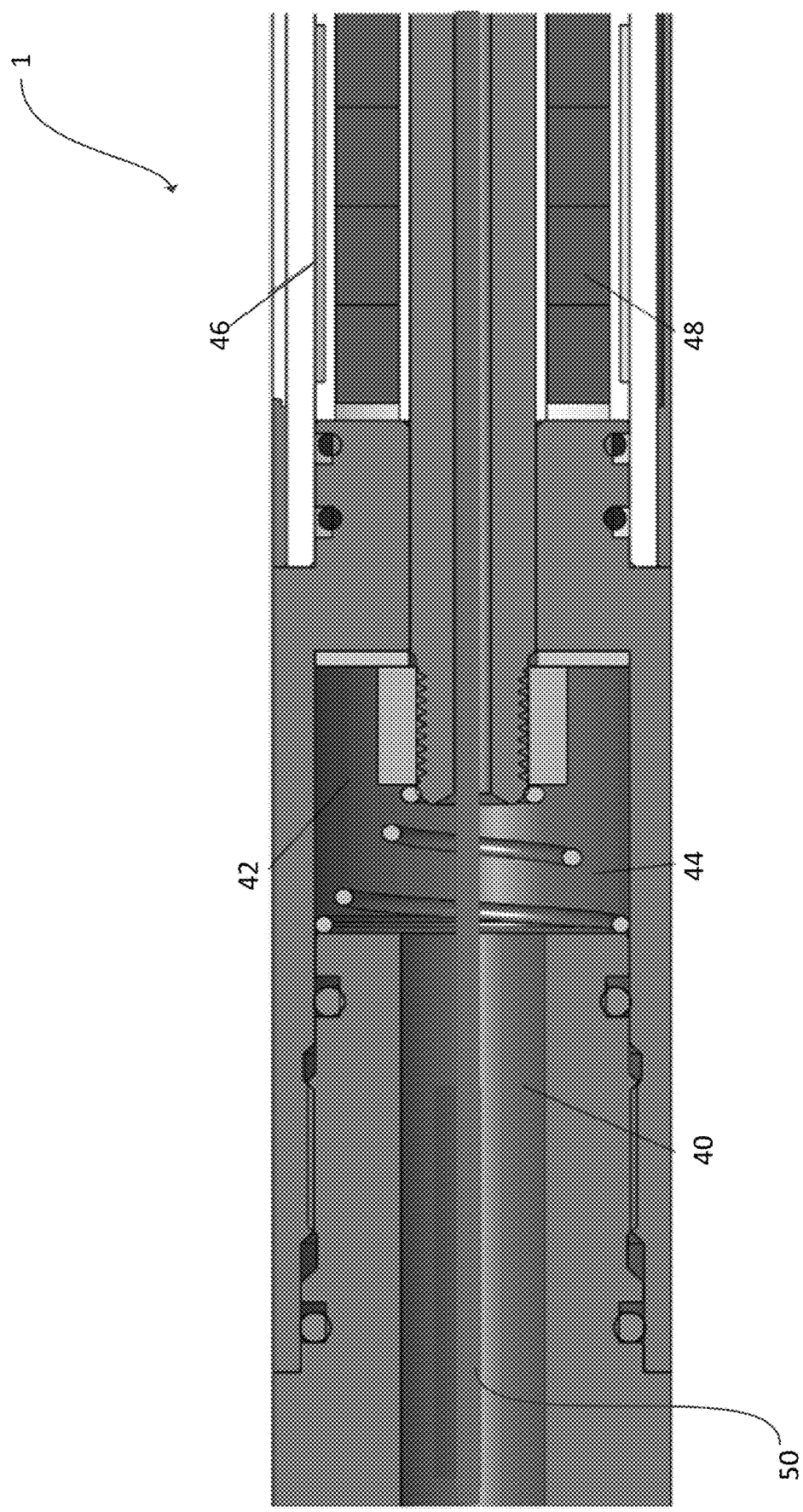
FIG. 3 is an enlarged cross-sectional view of a module for the resistivity tool showing a conical grounding spring according to an embodiment.

FIG. 3 illustrates an embodiment in which the resistivity tool 1 comprises a conical spring 44, coil winding 46, and ferrite under coil 48. In this embodiment, conical spring 44 is located in the open space 42 of resistivity tool 1. The conical spring 44 presses down on the ground shield of the central wiring harness 50 and electrically closes the space 42 inside the resistivity tool 1.

Figure 4:
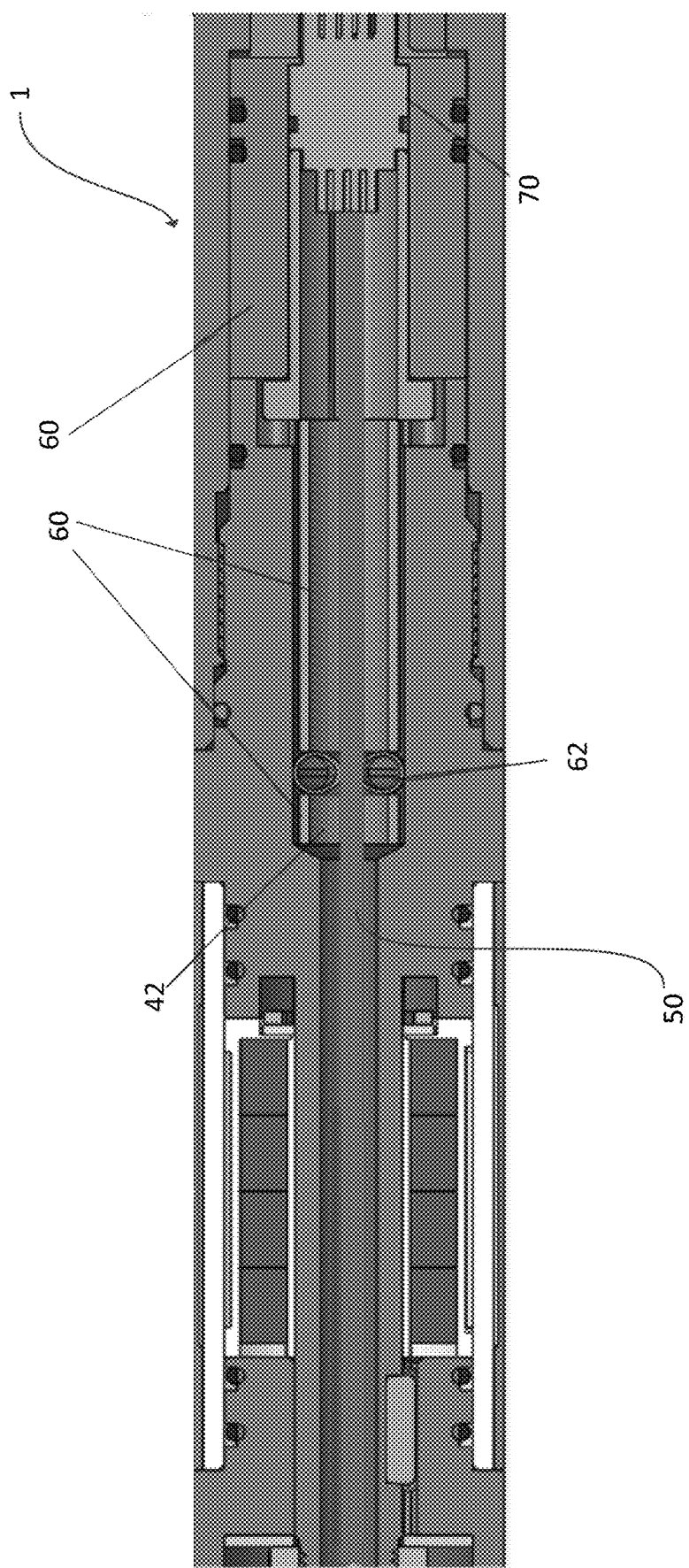
FIG. 4 is an enlarged cross-sectional view of a module for the resistivity tool showing a toroidal grounding spring near a modular connector according to an embodiment.

FIG. 4 illustrates an embodiment in which the resistivity tool 1 comprises a toroidal spring 62 and connector 70. In this embodiment, metallic pipe sections 60 squeeze toroidal spring 62 as resistivity tool 1 is assembled, and the toroidal spring 62 is pressed against the ground of the central wiring harness 50 and electrically closes the space 42 inside the resistivity tool 1.

Figure 5:
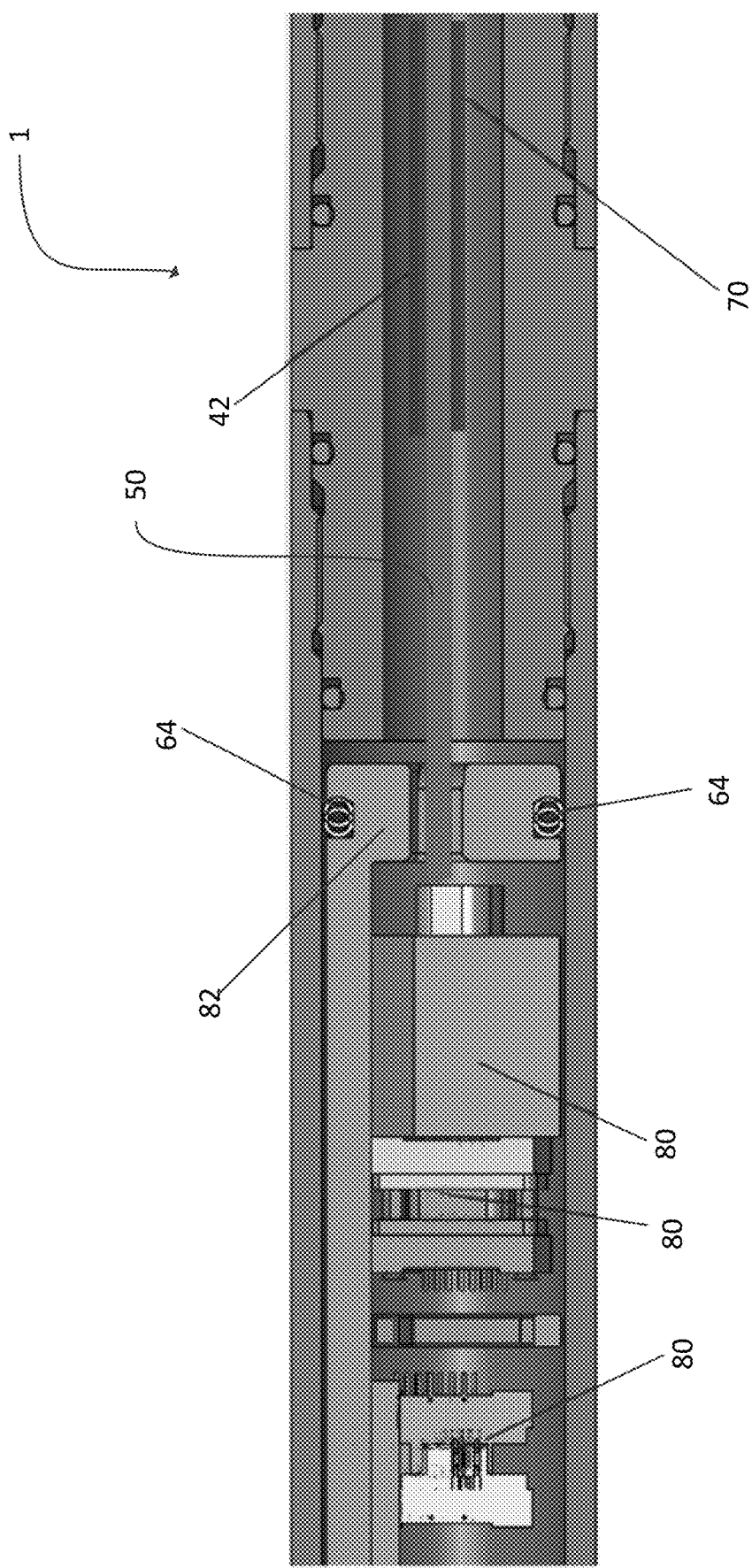
FIG. 5 is an enlarged cross-sectional view of a module for the resistivity tool showing a toroidal grounding spring on an electronics chassis according to an embodiment.

FIG. 5 illustrates a further embodiment in which the resistivity tool 1 comprises a toroidal spring 64, electrically grounding one side of the electronics chassis 82 of resistivity tool 1, which holds electronic components 80. The other side of the electronic chassis 82 is grounded with a direct mechanical connection through the ground shield of the central wiring harness 50.

While the different structures for preventing propagation of EM signals within resistivity tool 1 are illustrated in FIGS. 3 to 5, a person skilled in the art will appreciate that a combination of one or more of these structures may be incorporated into the resistivity tool 1.

Figure 6:
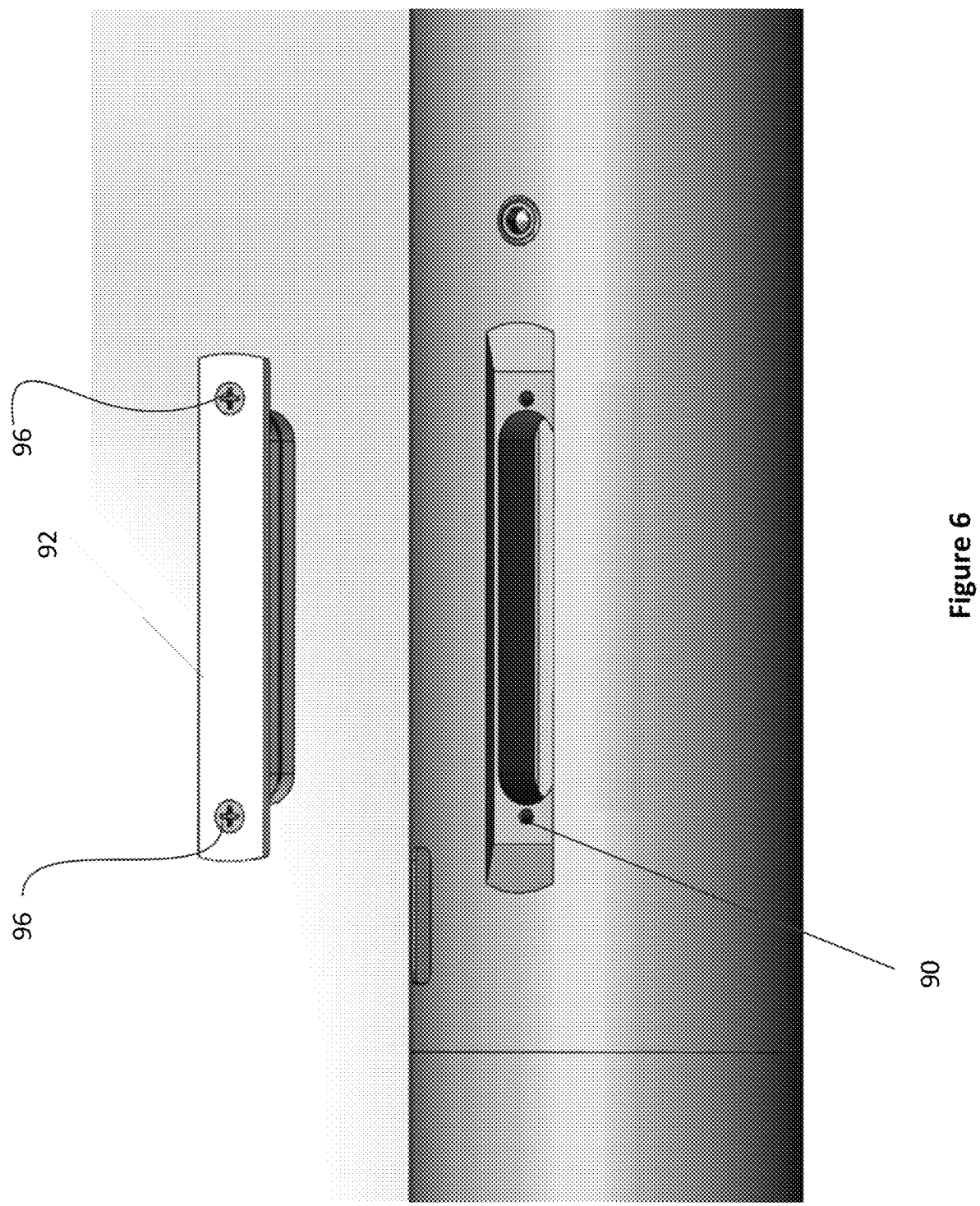
FIG. 6 is an enlarged front view of cut-outs in the collar of the resistivity tool according to an embodiment.

In some embodiments, the collars which fit around the resistivity tool 1 have a plurality of cut-outs 90 as shown in FIG. 6. The plurality of cut-outs 90 allows the EM waves to pass from the resistivity tool 1 into the formation. In the embodiment illustrated in FIG. 6, cut-outs 90 are blocked with non-conductive plugs 92 that are fastened into place using plug fasteners 96. In some embodiments, plug fastener 96 comprises screws. In some embodiments, other types of fasteners known to a person skilled in the art may be used. The non-conductive plugs 92 can be easily serviced in contrast to permanent moulded inserts used in the prior art.

In some embodiments, plugs 92 comprise conductive material that blocks the electromagnetic waves. The plugs 92 may be positioned in the same azimuthal positions along one side of the resistivity tool 1. In such arrangement, the resistivity measurement will be focused in the opposite direction and allow the sensitivity of resistivity tool 1 to change from being equal in all directions to being focused in a certain direction. The tool string can then be turned, and resistivity measured by the resistivity tool 1, as a function of direction.

In some embodiments, each segment of collar 6 comprises three cut-outs 90. In the illustrated embodiment, the three cut-outs are spaced evenly around the circumference of the collar 6. Eddy currents induced in the drill collar 6 have a detrimental effect on the transmitted EM signal. As the number of cut-outs 90 increases, the eddy currents along the edges of cut-outs 90 decrease but the eddy currents along the tops and bottoms of the cut-outs 90 may remain the same. In some embodiments, the cut-outs 90 have a length and width of 7.5 inches and 1.0 inches, respectively.

In some embodiments, cut-outs 90 are arranged symmetrically around the central axis of the resistivity tool 1. In some embodiments, the cut-outs 90 are either arranged or blocked to focus the EM field on one side of the resistivity tool 1. In some embodiments, the cut-outs 90 are protected with metallic ribs protruding from the bulk of the collar between cut-outs 90 and/or by metallic rings placed on the outside of the collar 6 above and below the cut-outs 90. The ribs and rings allows the force of the borehole to not be borne by the materials blocking the cut-outs 90. In some embodiments, these rings and ribs are produced through the process of hard-banding which deposits metal on collar 6 in a way similar to welding.

Figure 7:
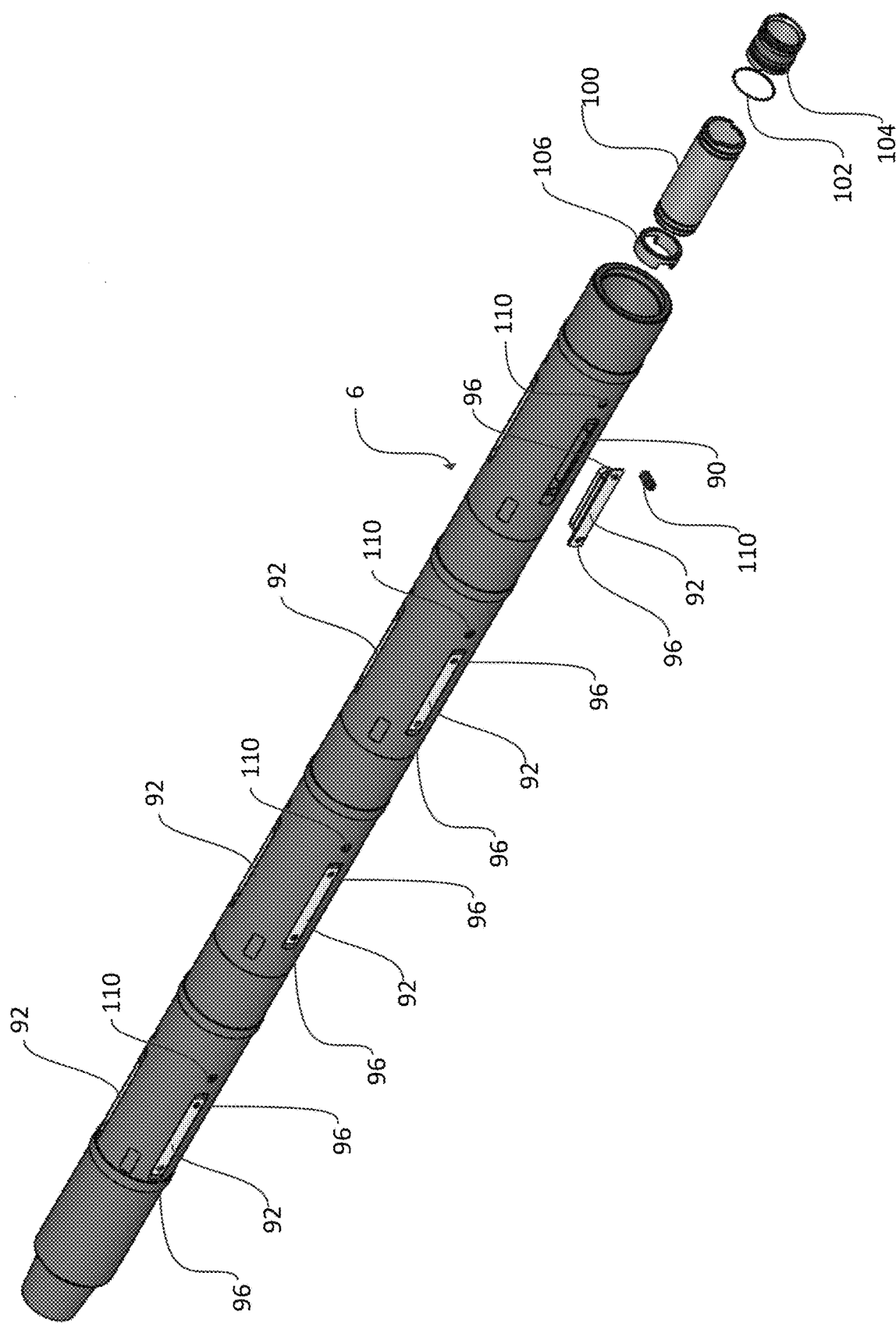
FIG. 7 is a perspective view of collar with cut-outs according to an embodiment.

FIG. 7 illustrates an embodiment of the collar 6 with cut-outs 90 being blocked by plugs 92. In this embodiment, non-conductive sleeves 100 for resistivity tool 1 are placed underneath cut-outs 90 to hold the pressure differential between the inside and the outside of the collar 6 while allowing the EM signal to escape through the cut-outs 90. In some embodiments, conductive sleeves and non-conductive sleeves 100 may be alternated down the inside of collar 6. The conductive sleeves are inserted to properly space the non-conductive sleeves 100 inside collar 6.

In some embodiments, collar 6 comprises backup sleeves 106 which have grab points that can be used to pull the backup sleeve 106, conductive sleeve, and non-conductive sleeve 100 out from inside the collar 6. The non-conductive sleeves 100 are held in place by sleeve fasteners 110. In some embodiments, the sleeve fasteners 110 comprise non-magnetic stainless steel. In some embodiments, the sleeve fasteners 110 comprise other non-magnetic metals known to a person skilled in the art. The sleeve fasteners 110 are non-magnetic so that they do not scramble the magnetic sensors in the nearby directional unit of the tool string.

Between the non-conductive sleeves 100 and the conductive sleeves, collar 6 comprises conductive lock rings 104 (including O-ring s102) for facilitating connection of the sleeves (i.e., conductive sleeves and non-conductive sleeves 100) to one another within collar 6. In this embodiment, lock ring 104 comprises a channel shaped to fit a sleeve fastener 110, which holds the non-conductive sleeves 100 and the conductive sleeves in place when inserted into the channel.

Figure 8:
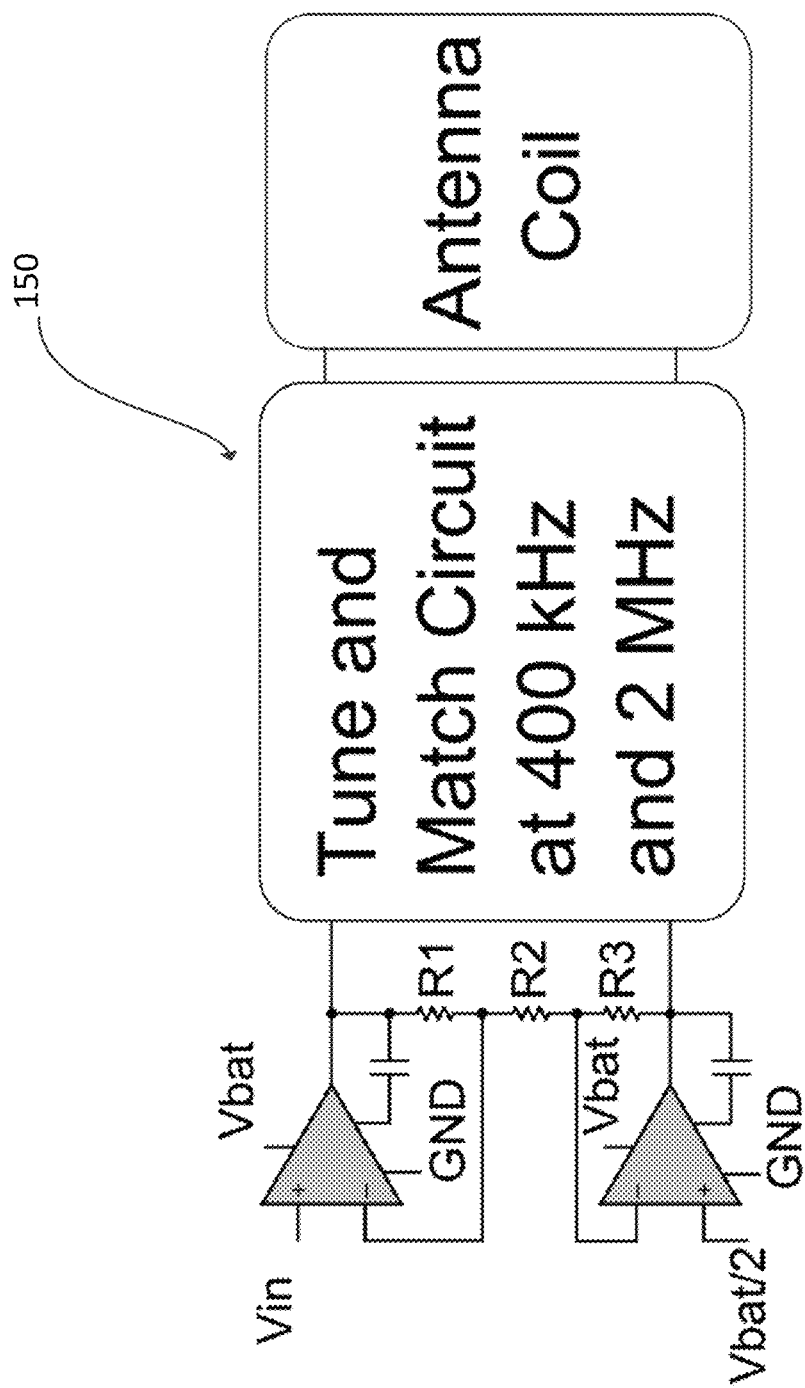
FIG. 8 is a schematic view of the transmission circuit used in the resistivity tool according to an embodiment.

In one embodiment, at least one of the EM signal transmitters, including first EM signal transmitter 10a and second EM signal transmitter 10b, comprises a doubly tuned and matched circuit with a fully differential drive circuit 150 as shown in FIG. 8. The drive circuit both pushes and pulls current through the matching circuit simultaneously. In one embodiment, with an input battery voltage of 28V, the transmission circuit 150 can put a signal of 56V peak to peak across the matching circuit. The matching circuit changes the impedance level and brings this voltage up to approximately 560V across the antenna. In one embodiment, voltage of ≥20× can be placed across the transmitter coil of an EM signal transmitter (e.g., EM signal transmitter 10) using only a battery voltage of x. This tuned impedance matching circuit allows energy to oscillate back and forth inside it in such a way that it flows out through the antenna rather than being converted to heat.

In one embodiment, at least one of the EM signal receivers, including first EM signal receiver 22a and second EM signal receiver 22b, comprise a coil connected to a doubly tuned and matched circuit interfacing it to a fully differential low noise amplifier chain. This chain feeds into a mixer which down converts the signal to an intermediate frequency which is filtered and digitized. The digitized signals are then fed through an algorithm which picks out only the magnitude and phase of the intermediate frequency and ignoring noise.

When using a tuned receiver circuit, calibration is necessary because the receiver circuit may have random start phases that arise from the tolerances in electronic components.

In one embodiment, when the resistivity tool 1 is first produced, the random starting phases are noted. The firmware of resistivity tool 1 is then instructed to always add or subtract these start phases plus an additional phase A such that both start phases at room temperature in air are always A.

For example, in one embodiment, the first EM signal receiver 22a has a random start phase of 91 degrees and the second EM signal receiver 22b has a random start phase of 40 degrees. To calibrate the resistivity tool 1, the firmware of resistivity tool 1 would be instructed to subtract 91 degrees from the phase of the first EM signal receiver 22a, add 40 degrees to the phase of the second EM signal receiver 22b, and add A=40 to both phases. The newly adjusted start phases are then both 40 degrees. In a conductive environment where the additional phase shift from the transmitter coil to the receiver coil of the first EM signal receiver 22a is X=125, and the phase shift between the coils is Y=145, on the measurement originating with the transmitter coil of the first EM signal transmitter 10a, the following phases are measured:

40+125=165, 125+145+40=310, phase diff=145 and on the measurement originating from the transmitter coil of the second EM signal transmitter 10b, the following phases are measured:

125+145+40=310, 125+40=165, phase diff=145.

Averaging the phase differences gives the correct result of Y=145.

Temperature and bed formation may influence the start phases of the receiver circuits of EM signal receivers 22. If the temperature and bed formation shift the start phase shift of the first EM signal receiver 22a by +20 degrees from the start phase shift when the EM signal receiver 22a is in the air at room temperature, and the start phase shift of the EM signal receiver 22a is shifted −16 degrees, then, after firmware correction, the measurement originating with the transmitter coil of the first EM signal transmitter 10a gives the following phases:

60+125=185, 125+145+20=290, phase difference=105 while on the measurement originating from the transmitter coil of the second EM signal transmitter 10b, the following phases are measured:

125+145+60=330, 125+20=145, phase difference=185.

Averaging the phase differences gives the correct result of Y=145 because the slight variations in starting phase cancel out. Accordingly, cancelling out the start phases compensates for the differing phase starting points caused by differences in component values between tools. Adding the constant phase "A" allows these starting phases to drift in either direction as a function of temperature and environment without compromising the computed arithmetic mean of phase difference which is used to compute resistivity.

In one embodiment, the resistivity tool 1 combines the magnitude and phase readings at a frequency to produce measures of resistivity and dielectric permittivity at that frequency.

Figure 9:
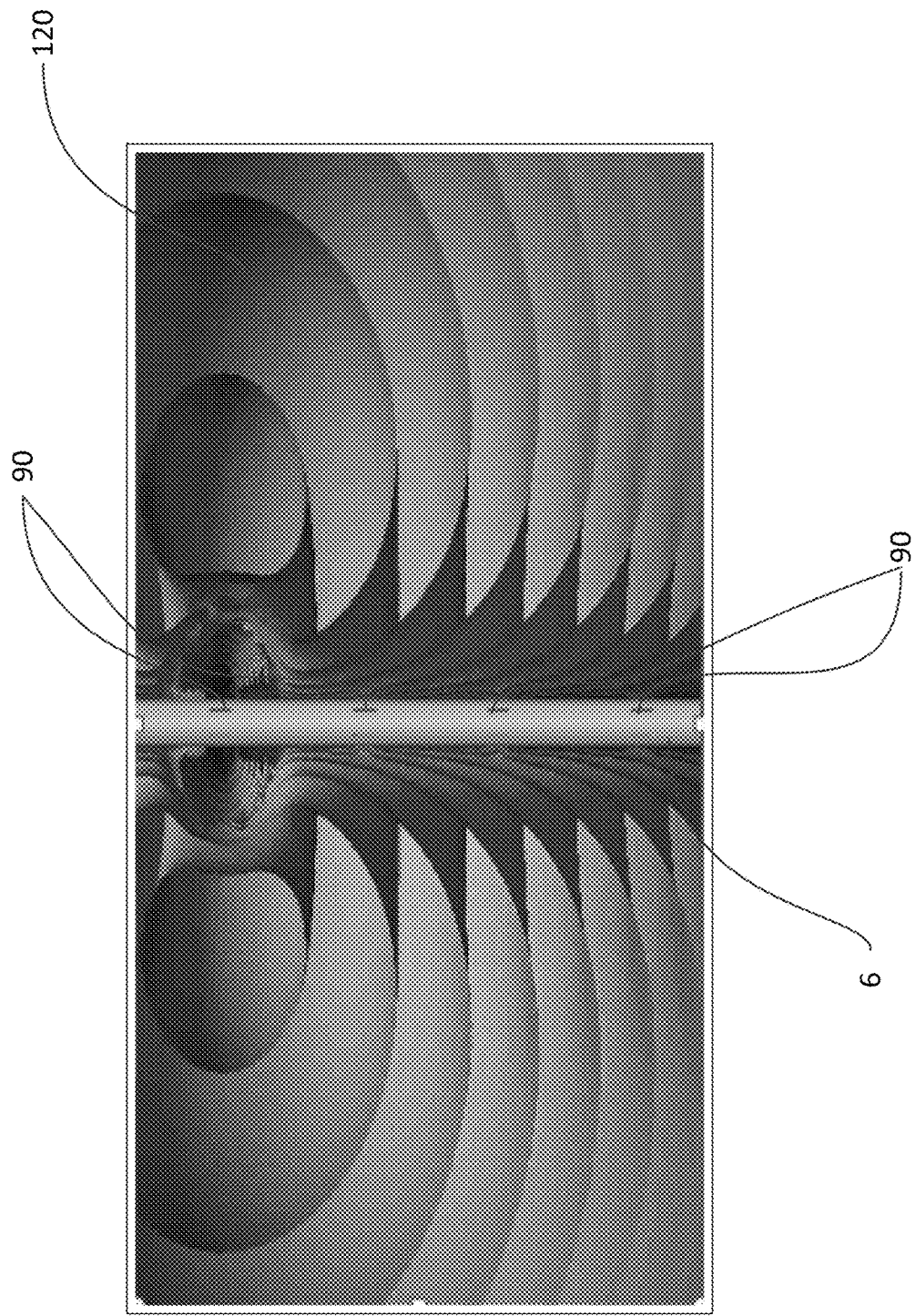
FIG. 9 is a cross-sectional view of a formation and the electromagnetic field generated from the resistivity tool according to an embodiment.

In one embodiment, the resistivity tool 1, having a first EM signal transmitter 10a, a second EM signal transmitter 10b, and EM signal receiver module 20, operates as follows. The second EM signal transmitter 10b, is turned on and transmits an EM signal. The EM signal propagates out through the slits in the metal shield over the transmitter coils in second signal transmitter 10b and then through cut-outs 90 in the collar 6. As illustrated in FIG. 9, the EM signal forms a bubble going out into the surrounding formation 120, and this near-field 'bubble' expands and contracts around the resistivity tool 1. The rate that the EM signal's phase advances, and the shape of the EM signal's intensity contours, are related to the electromagnetic properties of the formation including dielectric constant ($\varepsilon$), resistivity ($\rho$), and conductivity ($\mu$). The electromagnetic field is sampled by the EM signal receivers 22a and 22b in EM signal receiver module 20 along the length of the tool 1. The magnitude and phase of the electromagnetic field at these points is related to the shape and phase-advance of the near-field 'bubble'. These measurements on the surface of the resistivity tool 1 provide information about the material properties deep within the formation 120. The detected resistivity values are stored in the internal memory of the resistivity tool 1. In some embodiments, the value may also be reported to the directional unit of the tool string using the qBus communication protocol or the like. The directional unit then communicates this information to the surface according to its programming.

Some advantages of the embodiments described herein include:

Resistivity tool 1 can be calibrated easily with all the temperature effects of the formation and most of the tuning effects of the EM signal receivers and EM signal transmitters become irrelevant.

The configuration of the resistivity tool 1 tends to smooth out local anomalies in the borehole. For example, if there is a large rock near one of the EM signal transmitters, the measurement from that transmitter will be strongly affected but not the measurement from the other transmitter. The result is a bulk measurement around the resistivity tool 1.

The modular nature of the resistivity tool 1 makes assembly, transportation, and maintenance of the resistivity tool 1 easier.

A probe-style resistivity tool can be more cost effective as the tool strings can be retrieved when the drill string becomes lodged. If the collar becomes lodged downhole, the expensive inner probe can be removed by pulling it out from the surface thus only leaving the in-expensive outer collar stuck in the hole.

The configuration of resistivity tool 1 can overcome the difficulty of measuring signals using sensitive receivers that are only a short distance from the signal transmitters.

Unless the context clearly requires otherwise, throughout the description and the claims: "comprise," "comprising," and the like are to be construed in an inclusive sense, as opposed to an exclusive or exhaustive sense; that is to say, in the sense of "including, but not limited to". "Connected," "coupled," or any variant thereof, means any connection or coupling, either direct or indirect, between two or more elements; the coupling or connection between the elements can be physical, logical, or a combination thereof. "Herein," "above," "below," and words of similar import, when used to describe this specification shall refer to this specification as a whole and not to any particular portions of this specification. "Or" in reference to a list of two or more items, covers all of the following interpretations of the word: any of the items in the list, all of the items in the list, and any combination of the items in the list. The singular forms "a," "an," and "the" also include the meaning of any appropriate plural forms.

Words that indicate directions such as "vertical," "transverse", "horizontal," "upward," "downward," "forward," "backward," "inward," "outward", "vertical," "transverse," "left," "right," "front," "back", "top," "bottom," "below," "above," "under," and the like, used in this description and any accompanying claims (where present) depend on the specific orientation of the apparatus described and illustrated. The subject matter described herein may assume various alternative orientations. Accordingly, these directional terms are not strictly defined and should not be interpreted narrowly.

Where a component (e.g., a probe, a module, etc.) is referred to above, unless otherwise indicated, reference to that component (including a reference to a "means") should be interpreted as including as equivalents of that component, any component which performs the function of the described component (i.e., that is functionally equivalent), including components which are not structurally equivalent to the disclosed structure which performs the function in the illustrated exemplary embodiments of the invention.

Specific examples of systems, methods and apparatuses have been described herein for purposes of illustration. These are only examples. The technology provided herein can be applied to systems other than the example systems described above. Many alterations, modifications, additions, omissions and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

It is therefore intended that the following appended claims and claims hereafter introduced are interpreted to include all such modifications, permutations, additions, omissions and sub-combinations as may reasonably be inferred. The scope of the claims should not be limited by the preferred embodiments set forth in the examples, but should be given the broadest interpretation consistent with the description as a whole.

What is claimed is:

1. A tool for measuring resistivity in a formation comprising:
    a receiver module comprising a first electromagnetic signal receiver and a second electromagnetic signal receiver;
    a first pair of electromagnetic signal transmitters, wherein each electromagnetic signal transmitter is removably coupled to each longitudinal end of the receiver module;
    one or more additional pairs of electromagnetic signal transmitters, each of the electromagnetic signal transmitters from each additional pair is removably coupled to each longitudinal end of the tool, the first and the second electromagnetic signal receivers configured to receive electromagnetic signals propagating in the formation from the first pair and the one or more additional pairs of electromagnetic signal transmitters; and
    at least one grounding spring contact positioned within the tool, the grounding spring contact configured to block electromagnetic signals produced by any of electromagnetic signal transmitters propagating within the tool,
    wherein each additional pair of electromagnetic signal transmitters provides at least 4 additional depths of investigation of the formation.

2. The tool of claim 1 wherein the electromagnetic signal transmitters comprise transmitter coils.

3. The tool of claim 2 wherein the electromagnetic signal receivers comprise receiver coils.

4. The tool of claim 1 wherein the receiver module comprises a male portion configured for removable coupling to a female portion of one electromagnetic signal transmitter from the first pair.

5. The tool of claim 4 wherein the receiver module comprises a female portion configured for removable coupling to a male portion of one electromagnetic signal transmitter from the first pair.

6. The tool of claim 4 comprising bow-springs between the first pair of electromagnetic signal transmitters and the receiver module that are electrically connected to a drill collar.

7. The tool of claim 6 wherein the drill collar comprises at least one cut-out configured to allow electromagnetic signals to be transmitted into the formation from the first pair of electromagnetic signal transmitters.

8. The tool of claim 4 wherein the tool is a probe-style tool that is not mechanically locked to a drill collar.

9. The tool of claim 1, wherein the at least one grounding spring contact engages a ground shield of a wiring harness positioned along a longitudinal axis of the tool.

10. The tool of claim 1, wherein the at least one grounding spring contact comprises a circular spring electrically grounding one side of the tool containing electronics.

11. A tool for measuring resistivity in a formation comprising:
    a receiver module comprising a first electromagnetic signal receiver and a second electromagnetic signal receiver;
    a first electromagnetic signal transmitter removably coupled to one longitudinal end of the receiver module;
    a second electromagnetic signal transmitter removably coupled to the other longitudinal end of the receiver module;
    each of the first and the second electromagnetic signal receivers configured to receive electromagnetic signals propagating in the formation from the first and the second electromagnetic signal transmitters; and
    at least one grounding spring contact positioned within the tool, the grounding spring contact configured to block electromagnetic signals produced by the first and second electromagnetic signal transmitters propagating within the tool.

12. The tool of claim 11 wherein the at least one grounding spring contact engages a ground shield of a wiring harness positioned along a longitudinal axis of the tool.

13. The tool of claim 11 wherein the at least one grounding spring contact comprises a circular spring electrically grounding one side of the tool containing electronics.

14. The tool of claim 11 wherein the at least one grounding spring contact comprises a conical spring.

15. The tool of claim 11, comprising bow-springs between the first and second electromagnetic signal transmitters and the receiver module that are electrically connected to a drill collar, wherein the first and second electromagnetic signal transmitters comprise transmitter coils and the first and second electromagnetic signal receivers comprise receiver coils and wherein the transmitter coils and the receiver coils are covered by a metal shield having a series of slits and the slits and the bow-springs are configured to block electromagnetic signals produced by the first and second electromagnetic signal transmitters propagating between the tool and the drill collar.

16. The tool of claim 11, wherein the at least one grounding spring contact comprises a conical spring.

17. A tool for measuring resistivity in a formation comprising:
    a receiver module comprising a first electromagnetic signal receiver and a second electromagnetic signal receiver;
    a first electromagnetic signal transmitter removably coupled to one longitudinal end of the receiver module;
    a second electromagnetic signal transmitter removably coupled to the other longitudinal end of the receiver module; and
    each of the first and the second electromagnetic signal receivers configured to receive electromagnetic signals propagating in the formation from the first and the second electromagnetic signal transmitters,
    wherein at least one of the first electromagnetic signal receiver and the second electromagnetic signal receiver comprises a coil connected to a double-tuned and impedance-matched circuit that interfaces the coil to a fully differential low noise amplifier.

18. The tool of claim 17 wherein the electromagnetic signals received by the electromagnetic signal receivers are processed to remove noise.

19. The tool of claim 18 wherein noise removal comprises cancelling out start phases of the electromagnetic signal receivers and adding a constant phase.

20. A tool for measuring resistivity in a formation comprising:
    a receiver module comprising a first electromagnetic signal receiver and a second electromagnetic signal receiver;
    a first electromagnetic signal transmitter removably coupled to one longitudinal end of the receiver module;
    a second electromagnetic signal transmitter removably coupled to the other longitudinal end of the receiver module; and
    bow-springs between the first and second electromagnetic signal transmitters and the receiver module that are electrically connected to a drill collar, wherein each of the first and the second electromagnetic signal receivers are configured to receive electromagnetic signals propagating in the formation from the first and the second electromagnetic signal transmitters; and wherein the transmitter coils and the receiver coils are covered by a metal shield having a series of slits, and the slits and the bow-springs are configured to block electromagnetic signals produced by the first and second electromagnetic signal transmitters propagating between the tool and the drill collar.

* * * * *

UNITED STATES PATENT AND TRADEMARK OFFICE
CERTIFICATE OF CORRECTION

PATENT NO. : 10,955,580 B2
APPLICATION NO. : 15/476512
DATED : March 23, 2021
INVENTOR(S) : Karl Edler and Steve Braisher It is certified that error appears in the above-identified patent and that said Letters Patent is hereby corrected as shown below:

In the Specification

Column 8, Line 22, replace "$S_{T1R1} = M_{T1} A_{T1R1} G_{R1}{}^{i\omega t + \phi_{T1} + \phi_{T1R1} - \phi_{R1}}$," with -- $S_{T1R1} = M_{T1} A_{T1R1} G_{R1}{}^{i\omega t + \phi_{T1} + \phi_{T1R1} + \phi_{R1}}$ --

Column 8, Line 26, replace "$S_{T1R2} = M_{T1} A_{T1R1} G_{R2}{}^{i\omega t + \phi_{T1} + \phi_{T1R2} - \phi_{R2}}$," with -- $S_{T1R2} = M_{T1} A_{T1R1} G_{R2}{}^{i\omega t + \phi_{T1} + \phi_{T1R2} + \phi_{R2}}$ --

Signed and Sealed this
Sixteenth Day of July, 2024

*Katherine Kelly Vidal*

Katherine Kelly Vidal
*Director of the United States Patent and Trademark Office*